3,669,617
PROCESS FOR THE DIRECTIVE REMOVAL OF SO₃ FROM WASTE GAS
Norbert Lowicki, Duisburg-Hamborn, and Hans Teggers, Wesseling, Germany, assignors to Grillo-Werke Aktiengesellschaft, Duisburg-Hamborn, Germany
No Drawing. Filed Dec. 17, 1969, Ser. No. 886,000
Claims priority, application Germany, Dec. 13, 1969, P 19 62 587.7
Int. Cl. B01d *53/16, 53/34*
U.S. Cl. 23—2 S                                                21 Claims

ABSTRACT OF THE DISCLOSURE

Process of treating waste gas which contains $SO_3$ and is at a relatively high temperature, above its dew point, which comprises:
  (a) contacting the gas at said elevated temperature with an absorbent comprising (1) an amphoteric component and (2) a basic component, wherein the amphoteric component (1) is at least one member of the group oxides, hydrated oxides and hydroxides of aluminum, zinc, iron and manganese, and basic component (2) is at least one member of the group oxides and hydroxides of alkali metals and alkaline earth metals, for absorption of $SO_3$ from the gas and thereby lowering the dew point of the gas to a lower dew point;
  (b) utilizing at least part of the gas as a heating medium in a heat exchange whereby the gas is cooled to a relatively low temperature but above said lower dew point.

---

This invention relates to the directive removal of sulfur trioxide from waste gases and is particularly useful for lowering the dew point of flue gases. The process according to the invention is, therefore, particularly suitable to realize advantages in connection with utilization of the sensible residual heat of waste gases, especially flue gases. It becomes possible by means of the process of the invention to utilize the residual heat of waste gases in heat exchangers such as air preheaters or economizers with the use of lower exchange temperatures than was possible heretofore.

The dew point of a flue gas is substantially dependent upon its content of $SO_3$. At $SO_3$ contents of as low as about 50 mg./std. cu. m. the dew point ranges around 200° C. For this reason, power stations, especially oil-heated power stations do not lower the flue gas temperatures in the air preheater to less than 200 or 220° C. to avoid corrosion in this heat exchanger.

Upstream of the air preheater, the temperatures of the flue gas range between 350 and 450° C. The conditions are similar for the operation of economizers.

If it would be possible in the temperature range mentioned above of the flue gas, i.e. about 350 to 450° C., to remove the $SO_3$ substantially quantitatively from the flue gas by absorption, the flue gas temperature in the heat exchanger in subsequently utilizing the residual heat could be reduced to, for example, 100 to 120° C. without damage by corrosion having to be feared in the heat exchanger. It is this problem from which the invention starts. Above all, removal of sulfur trioxide from the waste gases is aimed at. The other sulfur compounds which are conventionally present, especially $SO_2$, do not interfere with utilization of residual heat or are at least far less harmful. Accordingly, it is possible by means of the process of the invention to absorb $SO_3$ substantially quantitatively from waste gases, especially flue gases, while the other sulfur compounds remain at least partially in the flue gas stream. This is what is meant by the "directive" removal of $SO_3$.

Absorption of acidic sulfur compounds, especially sulfur oxides, on basic absorbents is known. For example, British Pat. 1,144,071 discloses a process for the removal of sulfur and sulfur compounds from industrial waste gases, especially flue gases, wherein the waste gas containing sulfur compounds is contacted with a solid absorbent which consists of a hydratable mixture of amphoteric components and basic components. Oxides, oxide hydrates and/or hydroxides of manganese and/or iron are especially mentioned as amphoteric components in addition to those of aluminum and/or zinc. The basic component comprises oxides or hydroxides of alkaline earth metals and/or alkali metals. Particular importance may be attributable to magnesium. One absorbent composition described as particularly important in said British patent is a mixture of the corresponding oxidic compounds of manganese and magnesium. If desired, this mass may additionally contain corresponding compounds of iron. The reactive absorbent used in the British patent is a product which has been obtained by complete hydration of the oxide compounds resulting from roasting at elevated temperatures. Just this hydration of the metal oxide compounds tis emphasized as critical for the attainment of a highly active absorbent composition.

The absorbent which is loaded with sulfur and sulfur compounds is then freed from sulfur in a separate process step by roasting. This desulfurization may be performed in a plurality of steps by first reducing the sulfur-loaded mass with carbon, especially coke, at temperatures above 1,000° C. and then subjecting it in a second step to an oxidative treatment at a temperature within the range from 300 to 800° C. However, in case of the commercially particularly important mixtures of the oxidic compounds of magnesium and manganese and, if desired, iron, it is also possible to subject the absorbent which is loaded with sulfur or sulfur compounds directly to oxidizing roasting without prior reducing treatment. In this case, temperatures of at least 750° C. and preferably between 800° and 1,000° C. are used.

This regeneration by roasting involves the formation of oxide compounds between the basic component and the amphoteric metal component in the absorbent thereby mutually protecting both of the components against deactivation in the temperature range necessary for the roasting step. If compound of magnesium and manganese are used, well defined magnesium manganites may form. Hydration for the re-use of the oxidic absorbents having been roasted in this manner is effected in the process of British Patent 1,144,071 by slurrying the roasted mass in water at a temperature within the range from 60° to 100° C. and treating it for 2 to 8 hours. The hydrated product is separated from the suspension and contacted as a material which appears to be largely dry with the waste gas to be freed from sulfur compounds, said contacting being effected, for example, at temperatures within the range from above the dew point of the gas being treated up to 300° C.

British Pat. 871,076 describes a process for the removal of organosulfur compounds which contain the sulfur attached to radicals which contain carbon atoms. Oxidic metal oxide mixtures obtained by roasting are used as absorbent. The components of this absorbent are formed, on the one hand, by metals which are capable of forming sesquioxides, specific examples being iron, manganese, chromium and cobalt. On the other hand, lead or alkaline earth metals or oxides thereof are used. Magnesium, zinc and cadmium are particularly mentioned in addition to lead. These absorbents are used in a non-hydrated state as porous oxidic masses. The British Patent describes in detail the complete removal of organosulfur compounds of the type of thiophene or carbon disulfide at temperatures and for contact periods sufficient to desulfurize substantially completely the gas stream being purified. The desulfurization is effected at temperatures in the range from about 300° to 500° C. The residence times of the gas stream being desulfurized over the absorbent are considerable and range between about 7 and 12 seconds. The desulfurizing absorbents are loaded with 20% by weight and more of sulfur.

Applicants' copending U.S. patent application Ser. No. 886,017 filed Dec. 17, 1969 discloses a continouus process for the absorption of sulfur compounds from waste gases on basic absorbents based on hydroxides and/or oxide hydrates of magnesium and manganese and, if desired, iron with regeneration of the sulfur-loaded absorbent by roasting in the presence of a reducing agent followed by hydration and return of the resultant metal oxide compounds. This process which is a further development of the teaching of British Pat. 1,144,071 comprises bringing the absorbent as an aqueous suspension in finely divided form into turbulent and intimate contact with the waste gas stream in the absorption stage; recycling the aqueous suspension into the absorption stage after separation from the treated waste gas stream while using temperatures up to about 110° C. in the absorption stage; separating absorbent from the aqueous suspension and passing it into the regeneration stage while adding a corresponding amount of regenerated absorbent to the aqueous suspension. Preferably the fresh absorbent is added to the circulating aqueous suspension of the largely loaded absorbent at a rate sufficient that the pH value of the aqueous suspension of the absorbent ranges from about 6 to 7 and preferably from 6.5 to 7. Preferably the regenerated absorbent is added as a roasted product to the aqueous suspension and hydrated therein to form the active absorbent. Preferred absorbents contain from 1 to 10 molar parts of MgO together with 1 to 4 molar parts of $MnO_2$, molar ratios of $MgO/MnO_2$ in the range from 3:1 to 6:1 being preferred. If iron is also present in the absorbent, its amount preferably is not more than 50% and especially not more than 25% of the manganese proportion of an iron-free absorbent comprising manganese and magnesium compounds.

In applicants' copending patent application, completely hydrated absorbents of the type contemplated herein are also used. The object of this process is the extensive removal of all sulfur compounds from waste gases, especially flue gases.

It has now been found surprisingly that entirely novel desulfurization results are obtainable with absorbents as described in applicants' British Patent 1,144,071 and especially in the copending U.S. patent application mentioned above by using these oxidic compounds in the form of non-hydrated roasted masses and operating at comparatively elevated absorption temperatures. The essential feature of the invention is, accordingly, the use of such absorbents of the type mentioned which are not hydrated or at least incompletely hydrated. It has been found that a substantially 100% absorption is effected by such absorbents at an unmeasurably high reaction rate. According to the invention, these non-hydrated absorbents are contacted with hot $SO_3$-containing waste gases, especially flue gases, at elevated temperatures of, for example, above 250° C. $SO_3$ is absorbed in this manner quantitatively in a technically interesting temperature range while other sulfur compounds, especially $SO_2$, are absorbed hardly or only to a minor degree in the short periods of time necessary for absorption of $SO_3$. This high activity of the absorbent for $SO_3$ is retained until the charge of sulfur in the absorbent has reached limits which are influenced by the particular composition of the absorbent. As a rule, about 15% by weight is the upper limit of sulfur charge. The reaction times necessary for the process of the invention are generally below 3 seconds. Preferably residence times of less than 1 second are used.

Accordingly, it is an object of this invention to provide a process for the directive removal of $SO_3$ from waste gas and especially for the lowering of the dew point of flue gas by treatment of the waste gas with a basic absorbent, the process comprising contacting the hot waste gas stream, at temperatures above its dew point and for a short period of time, with an absorbent containing magnesium and manganese oxide compounds and formed by roasting at elevated temperatures, in which part of the manganese may be replaced by iron.

As a rule, this dry absorption of $SO_3$ is effected in the temperature range from 250 to 600° C., preferably at temperatures from about 300 to 480° C. $SO_3$ is absorbed substantially completely and rapidly under the conditions according to the invention to closely below the limiting value of sulfur load for $SO_3$ absorption. After the abovementioned upper limit has been reached, the absorption rate drops very rapidly. It is obvious herefrom that the absorption within the process of the invention cannot be a simple neutralization reaction but that this absorption is based on a specific and previously unknown type of reaction mechanism, this type of reaction mechanism being dependent upon the particular composition of the absorbent and its chemical condition.

The preferred absorbent contains from 1 to 10 molar parts of MgO together with 1 to 4 molar parts of $MnO_2$, $MgO/MnO_2$ molar ratios ranging from 2:1 to 6:1 and especially from 3:1 to 4:1 being particularly preferred. If iron is contained in the absorbent, a maximum of about 50% by wt. and preferably a maximum up to 25% by weight of the manganese are replaced by iron. The higher the MgO content of the absorbent, the higher the limiting value for sulfur load in $SO_3$ absorption within the range mentioned above, the maximum upper limit of which is about 15% by weight. These absorbents are used in dry, non-hydrated state, preferably as a fine-grained mass which has been formed by joint oxidizing roasting of the components at temperatures above 300° C. and preferably above 500° C. and especially within a temperature range from about 750 to 1,000° C. This means practically that the products obtained as primary products by regeneration of the sulfur-loaded absorbents in the process of British Pat. 1,144,071 may be used as absorbents in the present process. Since the process described in this British patent for the regeneration of the sulfur-containing absorbents is also suitable for the present process, recycling of the absorbent between absorption stage and regeneration stage becomes also possible for the process for the directive removal of $SO_3$ according to the invention. Additional to the disclosure of British Pat. 1,144,071, regeneration of the sulfur-loaded absorbent generally becomes possible by effecting the oxidizing roasting in the presence of any reducing agent which is preferably used in the amount necessary for reducing the sulfate sulfur to $SO_2$. Thus, it is possible to mix the sulfur-loaded absorbent not only with a solid carbonaceous material such as coke or coal dust, it being also possible to impregnate the loaded mass, prior to regeneration, with waste oil thereby bringing the reducing agents into direct contact with the sulfur compounds. Further reducing agents which may be used are petroleum fractions, natural gas and other reducing gases. Use of elemental sulfur as reducing agent or at least part thereof is also possible. The treatment may be effected in conventional roasting furnaces of any type. Preferably, story roasting furnaces or fluidized-bed roasting furnaces equipped for waste heat economy are used. It may furthermore be preferred to use mixtures of carbonaceous reducing agents and sulfur. In this manner, normally concentrated roasting gases are obtained, which permit the roasting furnace capacity to be utilized to a conventional extent. The temperature range which is particularly important for regeneration of the loaded absorbent and, consequently, for the provision of the highly active fresh absorbent is from about 750 to 1,000° C.

The absorbents obtained in this manner are generally contacted with the waste gas to be treated for a period of time of less than 1 second. Substantially quantitative absorption of $SO_3$ takes place within a period up to 0.5 second. In practice, performance of the process on a commercial scale frequently requires contact periods of about 0.2 to 0.7 second. Contact between the waste gas stream and the absorbent may be realized by various methods. In the preferred embodiment, the absorbent is used in finely divided form, the average particle size of at least about one half of all particles being preferably less than about 100 microns. A typical screen analysis of absorbents having been found to be suitable in practice is as follows: 50–60% <100 microns; 80% 40–500 microns; 8% >500 microns, balance <40 microns. This finely divided material is distributed as a cloud of flying dust in the waste gas stream being treated and carried by the latter through the reaction zone. The reaction zone may be constituted by a simple tube through which the gas flows, the pulverulent absorbent being fed into the gas stream before the inlet to this tube and fluidized therein. After having passed through the reaction chamber, the flying dust and the gas stream are separated in a suitable manner. This may be achieved by various methods. An example of a suitable method is pre-precipitation by treatment in a cyclone or a plurality of cyclones. However, it is also possible to achieve complete separation between the gaseous and solid phases in one process step by taking up the flue dust in an aqueous phase.

Apart from this treatment of the waste gas stream with the cloud of flying dust of the absorbent, which is particularly important in practice, it is possible to use a fluidized bed of the absorbent. For this purpose, the absorbent is shaped in conventional manner into relatively coarser pellets and then passed as pelletized material into a fluidized bed through which the waste gas stream being treated is passed in upward direction.

As a rule, it is preferred with both operation by the fluidized bed process and operation with the cloud of flying dust to recycle the dry absorbent. In case of the particularly preferred relative proportions of the constituents of the absorbent, the upper limit of load at which rapid decrease in absorption capacity for $SO_3$ begins is about 12 to 13% by weight of sulfur. It is preferred to establish an average degree of charge with sulfur of the absorbent of less than about 11% by weight by recycling part of the absorbent through the reaction zone and by adding fresh absorbent and withdrawing laden absorbent, said addition and withdrawal being preferably effected continuously. It may be particularly desirable to adjust the degree to which the absorbent is laden to about 8 to 10% by weight. It is ensured in this manner that, on the one hand, the capacity of the absorbent for rapid absorption of $SO_3$ is largely utilized and, consequently, economy of the process is ensured and, on the other hand, quantitative absorption of $SO_3$ is actually achieved in the short treating period available.

The waste gases having been freed at least partially but preferably substantially completely of sulfur trioxide may contain considerable quantities of other sulfur compounds. Further desulfurization may but must not be necessary. For the purpose aimed at according to the invention, i.e. lowering the dew point of the flue gas, removal of $SO_3$ is primarily important. Thus, independently of their content of other sulfur compounds, the gases having been purified in this manner may already be used in a technically advantageous manner for exchange of sensible residual heat in conventional heat exchangers.

If desulfurization of the gas to a higher degree is desirable, the combination with the wet desulfurization process according to our copending U.S. patent application Ser. No. 886,017 is particularly recommendable for this purpose according to the invention. Accordingly, the gas is passed for this purpose into a further absorption stage in which the absorbent is maintained as an aqueous suspension which is finely divided and brought into a turbulent state by the waste gas stream. Temperatures up to about 110° C. are used in this absorption stage. This suspension of the absorbent is preferably laden with sulfur to a degree sufficient that the pH of the aqueous suspension of the absorbent is within the range from about 6 to 7 and preferably from 6.5 to 7.

This combination of hot desulfurization in a first stage with subsequent wet desulfurization at lower temperatures in a second stage is particularly advantageous for the process according to the invention because, on the one hand, the absorbents are identical as regards their chemical composition and, on the other hand, may be transferred in a simple manner from one stage into the other whereupon they are finally regenerated and then returned into the first process stage. Optimum realization of all effects influencing economy becomes possible in flue gas desulfurization.

First of all, the condition of the absorbent as it passes through the different stages of absorption and regeneration is followed: For hot absorptoin in the first process stage, the non-hydrated oxidic absorbent is used as obtained directly from the regeneration stage. In this first absorption stage, only a limited load of the absorbent with sulfur of, for example, about 10 to 12% by weight is adjusted for the removal of $SO_3$. This absorbent may now be fed directly into the absorbent suspension of the second absorption stage of the wet desulfurization process. As has been described in detail in our copending U.S. patent application mentioned above and relating to wet desulfurization, immediate hydration of the oxidic absorbent to form the highly active oxidic hydrate compounds takes place under the conditions maintained therein, these hydrate compounds effecting efficient and complete desulfurization under the conditions of wet absorption. The charge with sulfur compounds in the wet absorption stage exceeds by far the limiting value of the sulfur charge in the first absorption stage of the hot desulfurization process Thus, it is now possible in the second absorption stage to take up considerable additional amounts of sulfur in the hydrated absorbent. The absorbent which is finally fully charged is separated and passed to regeneration. Here, it is again converted into the non-hydrated oxidic reaction products which is supplied to the first absorption stage as fresh absorbent.

For such a course of the absorbent or at least part thereof through the various stages described herein, operation with the cloud of flying dust in the first absorption stage is particularly advantageous. Feeding and whirling of the highly pulverulent mass into the waste gas stream being treated before the beginning of the first absorption stage are extremely simple. Thereafter, the waste gas stream containing flying dust may be simply introduced into the aqueous absorbent suspension of the second absorption stage, if desired after separation of part of the flying dust, which, however, is by no means mandatory. In the second absorption stage, efficient and immediate separation of the gaseous phase and the solid phase takes place. In addition, the very finely divided absorbent is immediately hydrated and, therefore, is immediately available under the conditions of wet absorption for further sulfur absorption from the other sulfur compounds to be removed in the wet absorption stage. Finally, roasting in the regeneration stage results in a powder which is sufficiently finely divided that it can be returned directly into the first absorption stage substantially completely or at least for the most part after screening.

Finally, the cycle described herein and comprising the two absorption stages in connection with the regeneration stage is also particularly advantageous for optimum treatment of the waste gas to be desulfurized. $SO_3$ is removed substantially completely in the first absorption stage. This permits optimum recovery of the residual heat of the waste gas stream in waste heat economizers. In doing so, the waste gas stream which is still to be desulfurized more extensively is cooled to temperatures of the wet desulfurization stage. The stream may as such be passed directly to the wet desulfurization stage without higher superfluous evaporation losses by a necessary reduction in temperature occurring therein. It is obvious that this multistage operation gives an optimum process result in several respects.

In place of the multi-stage process described herein or in connection therewith, a different combination of process steps is possible in accordance with the invention.

Quantitative absorption of $SO_3$ from waste gases in the temperature range around 400° C. makes possible the removal of any or at least the most important sulfur compounds from flue gas. Initially, all of the sulfur compounds and especially the total content of $SO_2$ in the flue gas may be converted into $SO_3$ in a manner known per se. One suitable method for this purpose is conventional oxidation on vanadium catalysts at temperatures of about 500° C. The flue gas having thus been enriched in $SO_3$ is then freed of its content of $SO_3$ by the process according to the invention. This results in a substantially completely desulfurized but still dry and hot flue gas which is vented into the atmosphere.

It is also possible by means of the process described herein to desulfurize at least a partial stream of the total flue gas to be desulfurized to form a dry, hot and sulfur-free flue gas while the remaining quantity of gas is subjected to wet desulfurization by the process described above. The dry, hot and desulfurized partial gas stream is then combined with the humid waste gases of the main gas stream having been desulfurized by the wet process. This increases the temperature of this humid gas main stream thereby improving buoyancy of the total gas as it is vented into the atmosphere. It is obvious that there is a variety of possibilities to be balanced and giving always optimum charge of the absorbent and an optimum condition of the flue gas to be purified and especially to be vented into the atmosphere.

EXAMPLE 1

Absorption in a fluidized bed

Hot flue gas at a rate of 4,400 std. cu. m./hr. and a temperature of 400° C. is passed into a reactor provided with a sieve tray of 1,000 mm. diameter. Prior to starting-up, 285 kgs. of absorbent having previously been screened to a particle size between 0.04 and 0.5 mm. are placed on this sieve tray.

After start-up, 4 kgs. of fresh absorbent meeting the above specification are added by means of a disc feeder. This corresponds to 7.7 g. of absorbent per gram of $SO_3$ with an average $SO_3$ content of the gas to be purified of 118 mg./std. cu. m.

Residence time of the gas in the fluidized bed is 0.24 second. The gas passes through a cyclone separator arranged downstream of the reactor and the solids discharged from this separator are returned into the fluidized bed.

During the course of operation, an increase in particle size of the fluidized solids in the bed occurred by agglomeration of the particles. The material which was periodically discharged from the fluidized bed had a particle size of 80% between 0.5 and 0.8 mm. Only 16% were smaller than the normal starting particle size (0.5 mm.). The amount of this portion of the absorbent ranged between 0.8 and 1.3 kgs./hr. The balance in the form of fines passed through the cyclone and the air preheater and was precipitated in the wet desulfurization stage arranged downstream of the equipment mentioned above and became fully laden therein.

While that portion of the absorbent which was withdrawn directly from the fluidized bed (and comprised coarser particles) had an average S content of 10.8%, the S content of the fines was immaterially higher than that of the fresh absorbent charged.

In addition to the amount of about 3 kgs./hr. of absorbent fines which passed from the hot gas absorption stage into the wet absorption stage, fresh absorbent at an average rate of 6.2 kgs./hr. had to be added to the recirculating suspension to maintain the pH value at a constant level of 6.5 to 6.8. This corresponds exactly to the expense of absorbent previously determined for the removal of $SO_2$ (average, 1.3 g./std. cu. m.) from the flue gas.

No $SO_3$ was detectable in the flue gas downstream of the reactor.

EXAMPLE 2

Absorption in a fluidized bed to the upper limit of absorption capacity of the absorbent A flue gas stream having a temperature of 400° C. and containing 1.7 g. of $SO_2$ and 120 mg. of $SO_3$/std. cu. m. was passed through the reactor described above and provided with a cyclone at a rate of 4,400 std. cu. m./hr. Prior to start-up, the bed to be fluidized was filled with 320 kgs. of coarse-grained absorbent (85% between 0.2 and 0.75 mm.). No fresh absorbent was fed during the run.

For about 10 hours, no $SO_3$ was detectable in the flue gas downstream of the reactor. After 15 hours, 40 mg./std. cu. m. of $SO_3$ were detected in the flue gas downstream of the reactor. After further three hours, the amount of $SO_3$ in the flue gas was 105 mg./std. cu. m.

$SO_2$ content downstream of the reactor was constantly between 1.3 and 1.5 grams/std. cu. m.

Upon termination of the run in which no material was withdrawn from the fluidized bed, this material was inspected. Its particle size had increased to 0.5–1.0 mm. and its S content was 13.4%.

EXAMPLE 3

Absorption in a cloud of flying dust

The fluidizing tray was removed from the reactor of 1,000 mm. in diameter and 3 m. in length and replaced by an orifice plate the free opening of which had an area of 0.55 sq. m. A flue gas stream having a temperature of 400° C. and containing 1.9 g. of $SO_2$ and 128 mg. of $SO_3$ per std. cu. m. was passed through the reactor. Fresh absorbent having a particle size of 0.04 to 0.5 mm. was added above the orifice plate at an average rate of 31.8 kgs./hr.

Of this amount of absorbent, 17.5 kgs./hr.=55% were separated by the cyclone and discharged. Nothing was returned into the reactor. The residual amount of the absorbent was entrained into the wet absorption stage where it maintained the pH at a constant level between 6.5 and 7.0.

With a residence time of the gas of 0.43 second, 15.6 mg. of $SO_3$ were detected downstream of the reactor. This corresponds to 82% absorption.

EXAMPLE 4

Absorption in a cloud of flying dust with recirculation of the absorbent

A flue gas stream having a temperature of 400° C. and containing 1.8 g. of $SO_2$ and 122 mg. of $SO_3$ per stud. cu. m. was treated in the hot gas reactor at a rate of 8,000 std. cu. m. by the procedure described in Example 3. Fresh absorbent was added to the reactor at an average rate of 32 kgs./hr. and the total amount of the absorbent separated by the cyclone was returned into the reactor. After 17 hours, the pH in the wet absorption stage started to rise above 7.0 At this point, the quantity added of fresh absorbent was reduced to 8 kgs./hr. For pH adjustment, further 9 to 10 kgs. of fresh absorbent were then added directly to the recirculating suspension.

In this manner, a recirculating stock of dry absorbent of about 300 kgs./hr. had accumulated due to the gas rate and degree of separation of the cyclone, this stock remaining constant during the further course of the run.

As early as after 2 hours, no $SO_3$ was detectable in the flue gas downstream of the reactor, i.e. already with a quantity of about 70 kgs. of absorbent in the hot gas reactor.

Due to the complete removal of $SO_3$ from the flue gas, it was possible to cool the flue gas to 120° C. in the air preheater without corrosion by condensation of sulfuric acid taking place. Since a flue gas temperature which is lower by 20° C. for each increase in boiler efficiency by 1% can be assumed, this temperature of the flue gas which, in the present case, is lower by about 80° C. results in an increase in efficiency of the boiler by 4%. The run of this example was continued for about six weeks without a drop of efficiency.

EXAMPLE 5

From the main gas stream which was treated at a rate of 8,000 std. cu. m./hr., $SO_3$ was initially removed by the procedure of Example 4. Thereafter, $SO_2$ was removed in the wet absorption stage. During this treatment, the gas stream was cooled to 65–70° C.

At the same time, 500 std. cu. m./hr. of flue gas having a temperature of about 580 to 630° C. were withdrawn upstream of the last boiler flue pass and adjusted to a temperature of 500° C. by admixture of air of 20–25° C. This partial gas stream of about 580 to 600 std. cu. m./hr. was then passed through a catalyst bed consisting of a vanadium catalyst of 8 mm. particle size. This resulted in oxidation of about 90% of $SO_2$ contained in the flue gas to form $SO_3$. Thereafter the gas was desulfurized in a second fluidized bed reactor by the procedure described in Example 1. Into this fluidized bed which consisted of coarser particles of absorbent as described in Example 2, absorbent after coarse screening was continuously fed at an average rate of 1 kg./hr. About the same amount was withdrawn from the fluidized bed at intervals of 30 minutes. The solids discharged from the cyclone of this smaller parallel reactor were returned into the fluidized bed. The loss by entrained fines was very low and could not be determined exactly. The two gas streams were combined downstream of the wet desulfurization stage whereby the temperature of the total amount of gas was increased by about 20° C. to an average of 85–90° C. as compared with the temperature of the main gasing stream. The buoyancy condition having been improved by this mode of operation with a simultaneously reduced "streamer formation" at the top of the chimney was clearly obvious.

The $MnO_2/MgO$ molar ratio of the absorbent used in Examples 1, 2, and 5 was 1:3.5 and that of the absorbent used in Examples 3 and 4 was 1:4.0 to 1:4.2.

What is claimed is:

1. Process of treating waste gas which contains $SO_3$ and is at a relatively high temperature, above its dew point, which comprises:
    (a) contacting the gas at said elevated temperature with a non-hydrated absorbent comprising (1) an amphoteric component and (2) a basic component, wherein the amphoteric component (1) is a manganese oxide or manganese hydroxide, and basic component (2) is a magnesium oxide or magnesium hydroxide, for absorption of $SO_3$ from the gas and thereby lowering the dew point of the gas to a lower dew point;
    (b) utilizing at least part of the gas as a heating medium in a heat exchange whereby the gas is cooled to a relatively low temperature but above said lower dew point.

2. The process of claim 1 wherein use is made of a fine-grained absorbent which has been formed by joint oxidizing roasting of the components at temperatures above 300° C.

3. The process of claim 1, wherein the residence time of the gas stream in contact with the absorbent is less than 3 seconds.

4. The process of claim 1, wherein said gas stream is contacted with said absorbent at temperature of 250 to 600° C.

5. The process of claim 1, wherein the maximum degree of charge of the absorbent with sulfur is about 15% by weight.

6. The process of claim 1, wherein the gas contains $SO_2$ and the $SO_3$ is absorbed substantially completely while at least a considerable portion of the $SO_2$ remains in the gas.

7. The process of claim 1, wherein the absorbent contains 1 to 10 molar parts of MgO together with from 1 to 4 molar parts of $MnO_2$.

8. The process of claim 7, wherein up to about 50% by weight of the manganese is replaced by iron.

9. The process of claim 1, wherein the sulfur-laden absorbent is regenerated by roasting at temperatures of about 750 to 1,000° C. in the presence of a reducing agent and the regenerated absorbent is returned into the $SO_3$ absorption process.

10. The process of claim 1, wherein said absorbent is entrained as a cloud of flying dust of small particle size by the waste gas stream for said contacting.

11. The process of claim 1, wherein said absorbent is in the form of a fluidized bed during said contacting.

12. The process of claim 1, wherein absorbent is recycled through the reaction zone while maintaining an average degree of charge with sulfur of the absorbent of less than about 11% by weight by addition of fresh absorbent and withdrawal of charged absorbent.

13. The process of claim 1, wherein absorbent laden with sulfur is passed into a wet desulfurization stage in which the sulfur-laden absorbent is suspended in water and contacted with a gas stream containing sulfur or sulfur compounds at temperatures up to about 110° C.

14. The process of claim 13, wherein the gas freed of $SO_3$, after said heat exchange, is passed into the wet desulfurization stage for contacting therein with the absorbent suspended in water.

15. The process of claim 1, wherein a gas containing sulfur contaminants other than $SO_3$ is treated to convert such other contaminants to $SO_3$ and the resulting gas is used as said waste gas.

16. The process of claim 7, wherein the MgO to $MnO_2$ molar ratio is in the range of 2:1 to 6:1.

17. Process according to claim 1, wherein said waste gas contains sulfur contaminants other than $SO_3$, said other contaminants being substantially unaffected by said treatment, and wherein following said heat exchange the gas is contacted with an absorbent for removal of said other contaminants.

18. Process according to claim 17, wherein absorbent used in the SO$_3$ absorption is hydrolyzed and used in said absorption of other sulfur contaminants.

19. Process according to claim 1, wherein the gas is cooled in said heat exchanged to below about 120° C.

20. Process according to claim 1, said absorbent being formed by roasting at elevated temperature.

21. Process according to claim 1, wherein said gas stream is contacted with said absorbent at temperatures of about 300 to 480° C.

References Cited

UNITED STATES PATENTS

| | | | |
|---|---|---|---|
| 3,492,083 | 1/1970 | Lowicki et al. | 23—25 |
| 3,343,908 | 9/1967 | Wickert | 23—174 |

EARL C. THOMAS, Primary Examiner

U.S. Cl. X.R.

23—25 Q, 174